Aug. 17, 1937.                F. L. MAIN                    2,090,539
                          BRAKE MECHANISM
                       Filed March 23, 1936              2 Sheets—Sheet 1
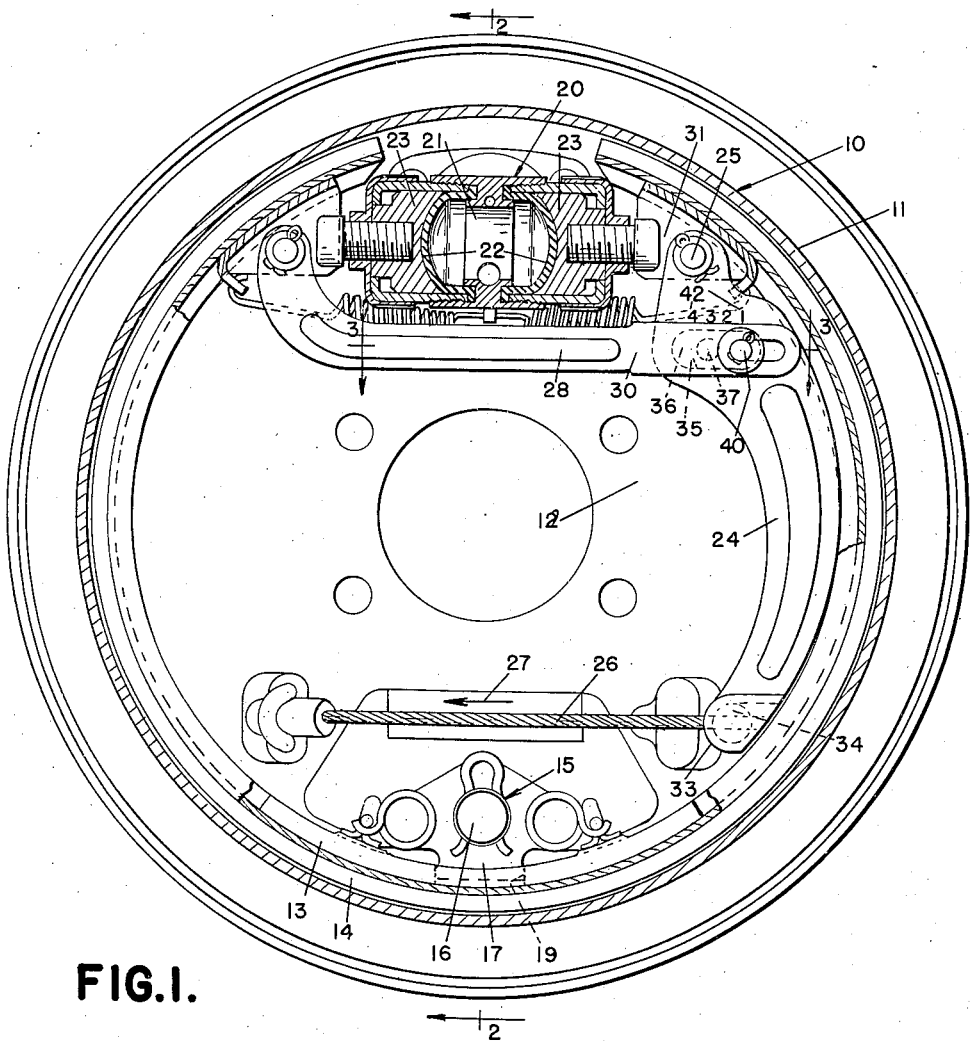
FIG.1.
FIG.3.
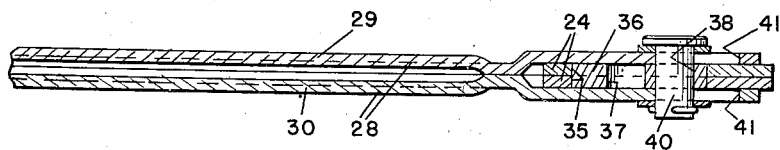
INVENTOR
FRANK L. MAIN
BY
ATTORNEY Aug. 17, 1937.  F. L. MAIN  2,090,539
BRAKE MECHANISM
Filed March 23, 1936   2 Sheets-Sheet 2
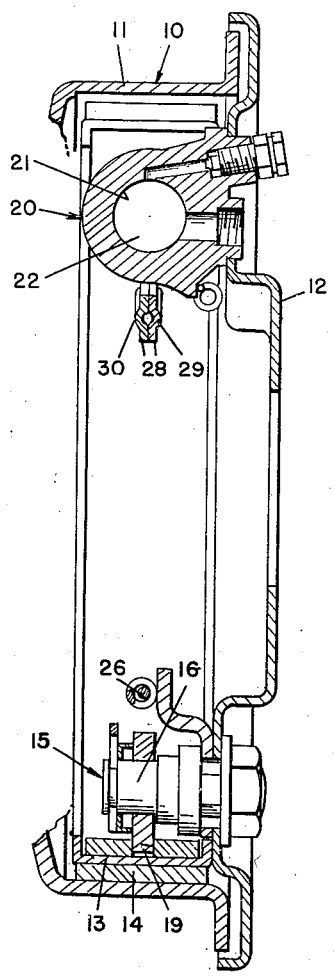
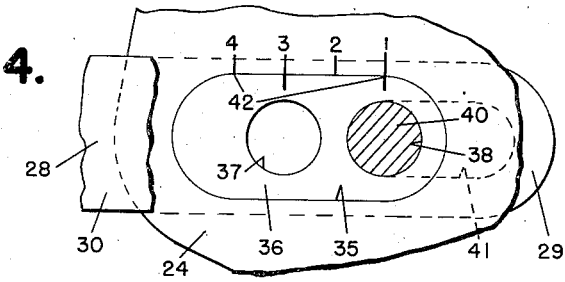
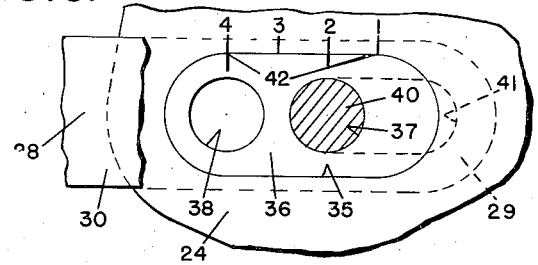
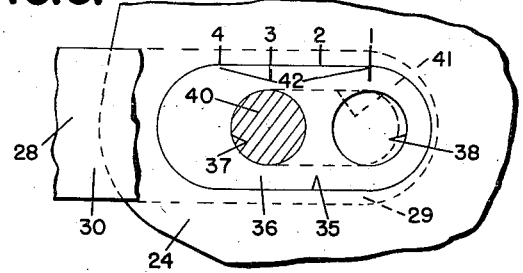
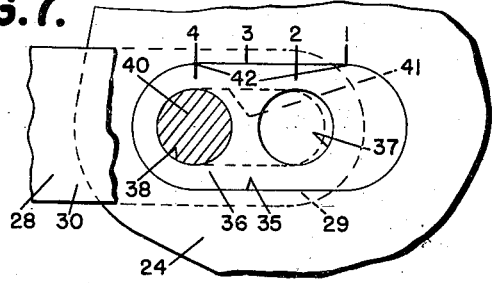
*INVENTOR*
FRANK L. MAIN
BY *Whittemore Hulbert Whittemore Belknap*
*ATTORNEYS*

Patented Aug. 17, 1937

2,090,539

UNITED STATES PATENT OFFICE 2,090,539

BRAKE MECHANISM

Frank L. Main, Birmingham, Mich., assignor to Kelsey-Hayes Wheel Company, Detroit, Mich., a corporation of Delaware Application March 23, 1936, Serial No. 70,433

16 Claims. (Cl. 188—79.5)

This invention relates generally to brake mechanism and refers more particularly to improved means for adjusting the brake friction means with respect to the braking surface on the drum.

One of the principal objects of the present invention consists in the provision of relatively simple, compact and inexpensive adjusting means for the brake friction means capable of being readily assembled in the brake mechanism.

Another advantageous feature of this invention resides in the provision of a combined mechanically and hydraulically actuated brake mechanism for the friction means embodying an adjustment for the latter incorporated in the linkage of the mechanism actuated in such a manner as to consume the minimum space within the drum.

A further object of this invention resides in the provision of brake mechanism having a hydraulic actuator positioned between the spaced ends of the friction means and having mechanically operated mechanism for said ends embodying means for adjusting both of the ends relative to the brake flange independent of the hydraulic actuator.

In addition to the above, the invention contemplates a mechanical actuator embodying an operating lever secured to one of the spaced ends of the friction means and having a link secured to the other end of the brake friction means and connected to the operating lever through the medium of an element adjustable to provide a plurality of increments of adjustment of the brake friction means relative to the brake flange.

The foregoing, as well as other objects, will be made more apparent as this description proceeds, especially when considered in connection with the accompanying drawings, wherein:

Figure 1 is a side elevational view of a brake mechanism with certain parts broken away for the sake of clearness;

Figure 2 is a sectional view taken substantially on the plane indicated by the line 2—2 of Figure 1;

Figure 3 is a sectional view taken substantially on the plane indicated by the line 3—3 of Figure 1; and Figures 4, 5, 6 and 7 are detailed views showing different positions of adjustment.

Inasmuch as one of the features of the present invention consists in the provision of adjusting mechanism so constructed as to occupy the minimum space within the drum, I have selected, for the purpose of illustrating the present invention, a brake construction wherein the available space for adjusting mechanism is definitely limited. However, it will be understood as this description proceeds that my improved adjusting means is not limited to the particular brake shown herein.

In detail, the brake shown in the drawings comprises a brake drum 10 having an annular brake flange 11 and having a backing plate 12 fixed relative to the drum at the inboard side of the brake flange. Upon reference to Figure 1, it will be noted that brake friction means, in the form of a band 13, is located within the drum and has a friction lining 14 on the exterior surface thereof for engaging the brake flange 11 of the drum. The brake band 13 is anchored intermediate the ends thereof, to the backing plate 12 through the medium of a centering device 15 comprising a stud 16 fixed to the backing plate and a plate 17 mounted for limited oscillation about the axis of the stud and having a portion 18 extending into a slot 19 formed in the band 13 intermediate the ends thereof.

Referring again to Figure 1, it will be noted that the ends of the band are spaced from each other circumferentially of the brake flange 11 and that two independent actuators are provided between the ends for expanding the brake friction means 14 on the band into engagement with the brake flange 11 of the drum. The actuator designated by the reference character 20 is of the hydraulic type and in the present instance, is shown as similar in construction to one described in the John William White Patent #1,999,675, issued April 30th, 1935. In general, the hydraulic actuator comprises a chamber 21 communicating with a source of fluid under pressure (not shown) and having opposed flexible end walls in the form of diaphragms 22 for actuating the pistons 23 which, in turn, are connected to the free ends of the brake band.

The mechanical actuator comprises a lever 24 having the upper end pivotally connected to the brake band 13 adjacent one end of the latter by means of a pin 25 for swinging movement in the plane of rotation of the drum and having the lower end operatively connected to a suitable control (not shown) through the medium of a cable 26. The arrangement is such that movement of the cable in the direction of the arrow 27 in Figure 1 effects a pivotal movement of the lever 24 about the axis of the pin 25 in a direction toward the axis of the drum. In order to expand the brake band to engage the friction lining 14 thereof with the brake flange 11 upon movement of the operating lever 24 in the above direction, I provide a link 28 having one end connected to the end of the brake band opposite the end to which the operating lever 24 is connected and having the other end pivotally connected to the operating lever 24 at a point spaced from the axis of the pin 25. With this arrangement, it will be seen that when the lower end of the operating lever 24 is moved in the direction of the arrow 27, the operating lever fulcrums about the point of pivotal connection of the link 28 with the lever 24 and in so doing, effects an outward displacement of the upper end of the lever to engage the adjacent portion of the band with the brake flange. In this connection, it is to be noted that the fulcrum for the operating lever 24 is free to swing in a direction inwardly of the brake flange about the axis of the pin 25 while the latter is being moved outwardly and this results in an outward movement of the opposite end portion of the band by the link 28.

In the present instance, a plurality of increments of adjustment of the band relative to the brake flange 11 is provided by means incorporated to the pivotal connection between the link 28 and the operating lever 24. Upon reference to Figure 3, it will be noted that the link 28 is formed of two complementary stampings 29 and 30 permanently secured together and having the portions thereof at the end, opposite the pivotal connection of the link with the band, spaced laterally from each other to slidably receive therebetween the operating lever 24. The operating lever 24 is also preferably formed of complementary stampings having the extreme upper ends spaced laterally from each other to receive the projection 31 extending inwardly from the adjacent end of the band and having the opposite ends fashioned as at 33 to provide a socket for receiving the enlarged portion 34 on the free end of the cable 26.

The portion of the operating lever 24 extending between the laterally spaced ends of the link 28 is formed with a slot 35 therein elongated in the direction of the link 28 for receiving an insert 36 of corresponding shape. Although it is to be noted that the insert 36 is removable from the slot 35 in the operating lever 24, nevertheless, the dimension of this insert is such that the edges thereof have a sliding fit with the side walls of the slot. As shown in Figures 4 to 7 inclusive, the insert is formed with two openings 37 and 38 therethrough for alternately receiving a pin 40 having its axis extending parallel to the axis of the drum and having the free ends thereof extending through elongated slots 41 in the laterally spaced ends of the link 28.

In the specific embodiment of the invention, the insert renders it possible to secure four increments of adjustment of the brake band, as clearly shown in Figures 4 to 7 inclusive. In detail, the openings 37 and 38 are non-symmetrically arranged in the insert 36 and the distance between the centers of the openings is equal to two-thirds of the total extent of adjustment represented in Figures 4 to 7 inclusive of the drawings by the reference character 42. In Figures 4 to 7 inclusive, the four increments of adjustment are indicated by the numbers 1 to 4 inclusive and in Figure 4, the pin 40 is shown in the position of adjustment designated by the character 1 while in the remaining figures, the pin 40 is shown successively in the positions of adjustment 2, 3 and 4. It will, of course, be understood that as the pin 40 is displaced in the lever 24 in a direction toward the vertical plane passing through the axis of the drum, both ends of the brake band are moved toward the brake flange, not only because the effective length of the lever 28 is increased, but also because the radius or travel of the pin 40 about the pin 25 is reduced.

Referring more in detail to the particular manner in which the four increments of adjustment mentioned above are secured, reference will again be made to Figures 4 to 7 inclusive. Assuming that it is desired to secure the increment of adjustment represented by the distance between the characters 1 and 2, the pin 40 is detached from the opening 38 in the insert 36 and the latter is removed from the slot 35. The insert is then interchanged end for end and re-inserted in the slot 35 whereupon the opening 37 aligns itself with position number 2 permitting the pin 40 to be re-assembled. This latter position of adjustment is shown in Figure 5 and in the event the position of adjustment shown in Figure 6 is desired, the pin and insert are again removed. The insert is then re-inserted after it has again been interchanged end for end and the opening 37 assumes the increment of adjustment designated by the position numbered 3. The last increment of adjustment, shown in Figure 7, is secured by again removing the insert 36 from the slot 35 and reinserting this insert after the same has been interchanged end for end. This brings the opening 38 into the position opposite the 4th increment of adjustment. Thus, it will be seen that although only two openings are formed in the insert, nevertheless, four increments of adjustment of the pin 40 and consequently, the band 13 are afforded. Furthermore, the above construction permits obtaining relatively fine adjustments of the brake band without interfering with the hydraulic actuator 20 and without the necessity of affording additional space in the drum to accommodate the adjustment mechanism. It is to be understood that the length of the cable 26 connecting the free end of the lever 24 with the mechanical brake operator is varied upon making the aforesaid adjustments in order that the end 33 of the lever may be retained in its normal position, irrespective of the adjustments previously referred to. The means for adjusting the cable is not shown herein but any one of the numerous take-up devices may be employed for this purpose.

Attention may also be called to the fact that in actual practice, the lever 24 is marked, as illustrated in the several views, and these marks are respectively identified by the numerals 1 to 4 inclusive. This appreciably facilitates assembly and also eliminates any chance for confusion in adjusting the brake.

What I claim as my invention is:

1. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, and a connection between the opposite end of the link and lever comprising an insert adjustably mounted in one of the latter elements to vary the point of connection of the link to the lever.

2. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, and a connection between the opposite end of the link and lever comprising a removable insert in one of the latter members interchangeable end for end to vary the point of connection of the link to the lever.

3. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, a connection between the opposite end of the link and lever at a point spaced from the pivotal connection of the lever to the friction means, said connection comprising an insert interchangeable end for end in the lever and having an opening therethrough non-symmetrically arranged with respect to the center of the insert, and a pin extending through the opening and pivotally connected to the link.

4. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, a connection between the opposite end of the link and lever at a point spaced from the pivotal connection of the lever to the friction means, said connection comprising an insert interchangeable end for end in the lever, and a pin extending laterally from the insert in non-symmetrical relation to the center of the insert and pivotally engaging the link.

5. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, means for securing a plurality of increments of adjustment of the friction means relative to the brake flange, said means comprising a connection between the link and lever having a member removably supported on one of the latter members and alternatively interchangeable end for end to succesively obtain the increments of adjustment aforesaid.

6. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, means for securing a plurality of increments of adjustment of the friction means relative to the brake flange, said means comprising a connection between the link and lever having a member removably supported on one of the latter members and having a pin non-symmetrically arranged with reference to the center of the member and engageable with the other of said members, said member being interchangeable end for end to successively secure the increments of adjustment aforesaid.

7. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, means for securing a plurality of increments of adjustment of the friction means relative to the brake flange, said means comprising a connection between the opposite end of the link and lever and including an insert removably supported in the lever and connected to the link, said insert being alternatively interchangeable end for end to successively vary the point of connection of the link with the lever by amounts equal to the increments of adjustment aforesaid.

8. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, a removable insert in the lever interchangeable end for end and having a plurality of openings therethrough non-symmetrically arranged with respect to the center of the insert, and means for alternately connecting the link with the insert at said openings.

9. In a brake mechanism, a brake drum having a brake flange, brake friction means engageable with the flange and having spaced ends, actuating means for the brake friction means including an operating link having one end pivotally connected to the friction means adjacent one end of the latter, a link having one end connected to the other end of the friction means, a removable insert in one of the links having openings therethrough non-symmetrically arranged with respect to the center of the insert and being successively interchangeable end for end to vary the location of the openings with respect to the connections of the links with the friction means, and means for alternately connecting the links together at said openings.

10. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, means for securing a plurality of increments of adjustment of the friction means relative to the brake flange, said means comprising a connection between the link and lever, and indicia applied adjacent said connection to form a guide in securing the increments of adjustment.

11. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, means for securing a plurality of increments of adjustment of the friction means relative to the brake flange, said means comprising a connection between the link and lever embodying a member removably supported on one of the latter members and alternatively interchangeable end for end to successively obtain the increments of adjustment aforesaid, and indicia applied to indicate the position of the member and to form a guide in securing the several increments of adjustment.

12. In a brake mechanism, a brake drum having a brake flange, brake friction means engageable with the flange and having spaced ends, actuating means for the brake friction means including an operating link having one end pivotally connected to the friction means adjacent one end of the latter, a second link having one end connected to the other end of the friction means, a member adjustably supported on one of the links and having openings therethrough adapted to assume different positions with respect to the connections of the links with the shoes upon adjustment of said member, and means for alternately connecting the other of said links to the member at said openings.

13. In a brake mechanism, a brake drum having a brake flange, brake friction means engageable with the flange and having spaced ends, actuating means for the brake friction means including an operating link having one end pivotally connected to the friction means adjacent one end of the latter, a second link having one end connected to the other end of the friction means, a member carried by one of the links having spaced attaching portions alternately attachable to the other of the links to provide increments of adjustment of the friction means relative to the brake flange and adjustably supported on the link aforesaid to provide additional increments of adjustment of the friction means relative to the brake flange.

14. In a brake mechanism, a brake drum having a brake flange, brake friction means engagable with the flange and having spaced ends, actuating means for the brake friction means including an operating link having one end pivotally connected to the friction means adjacent one end of the latter, a second link having one end connected to the other end of the friction means, a member supported on one of the links and interchangeable end for end, said member having an attaching portion providing for attachment of the other link to said member and effective upon interchanging said member end for end to assume different positions relative to the pivotal connections of the links with the friction means.

15. In a brake mechanism, a brake drum having a brake flange, brake friction means engageable with the flange and having spaced ends, actuating means for the brake friction means including an operating link having one end pivotally connected to the friction means adjacent one end of the latter, a second link having one end connected to the other end of the friction means, a member supported on one of the links and interchangeable end for end, said member having spaced attaching portions for alternate attachment to the other of the links and said portions being non-symmetrically arranged to assume different positions relative to the pivotal connections of the links with the brake friction means upon interchanging said member end for end.

16. In a brake mechanism, a brake drum having a brake flange, brake friction means engageable with the flange and having spaced ends, actuating means for the brake friction means including an operating lever having one end pivotally connected to the friction means adjacent one end thereof, a link having one end connected to the other end of the friction means, and a pivotal connection between the link and lever adjustable relative to both of the latter for varying the location of said connection with reference to the connections of the link and lever with the friction means.

FRANK L. MAIN.